(12) United States Patent
Betis et al.

(10) Patent No.: US 10,710,621 B2
(45) Date of Patent: Jul. 14, 2020

(54) METHOD, SYSTEM AND APPARATUS FOR CONTROLLING A VEHICLE

(71) Applicant: Hitachi Rail STS France, Courtaboeuf (FR)

(72) Inventors: Alexandre Betis, Saint Cloud (FR); Sébastien Couturier, Les Ulis (FR); Jian Sun, Wexford, PA (US)

(73) Assignee: HITACHI RAIL STS FRANCE, Courtaboeuf (FR)

( * ) Notice: Subject to any disclaimer, the term of this patent is extended or adjusted under 35 U.S.C. 154(b) by 143 days.

(21) Appl. No.: 15/823,946

(22) Filed: Nov. 28, 2017

(65) Prior Publication Data

US 2019/0161104 A1    May 30, 2019

(51) Int. Cl.

| B61L 27/04 | (2006.01) |
|---|---|
| G06K 9/00 | (2006.01) |
| B61L 25/02 | (2006.01) |
| B61L 3/00 | (2006.01) |
| G06T 7/73 | (2017.01) |
| B61L 15/00 | (2006.01) |
| B61L 23/04 | (2006.01) |

(52) U.S. Cl.
CPC ............. *B61L 27/04* (2013.01); *B61L 3/002* (2013.01); *B61L 15/009* (2013.01); *B61L 23/04* (2013.01); *B61L 23/041* (2013.01); *B61L 25/021* (2013.01); *B61L 25/025* (2013.01); *G06K 9/00791* (2013.01); *G06T 7/75* (2017.01); *B61L 2201/00* (2013.01); *G06T 2207/10016* (2013.01); *G06T 2207/30204* (2013.01); *G06T 2207/30236* (2013.01); *G06T 2207/30252* (2013.01)

(58) Field of Classification Search
CPC ........ B61L 23/04; B61L 23/041; B61L 27/04; B61L 3/002; B61L 15/009; B61L 25/021; B61L 25/025; B61L 2201/00; G06T 7/75; G06T 2207/10016; G06T 2207/30204; G06T 2207/30236; G06T 2207/30252; G06K 9/00791
USPC .......................................................... 382/104
See application file for complete search history.

(56) References Cited

U.S. PATENT DOCUMENTS

| 2013/0046421 | A1* | 2/2013 | El Fassi | B61L 3/127 701/2 |
|---|---|---|---|---|
| 2014/0253722 | A1* | 9/2014 | Smyth | G01P 3/38 348/135 |
| 2016/0033603 | A1* | 2/2016 | Paul | G01R 33/4818 324/309 |
| 2016/0189393 | A1* | 6/2016 | Rao | G06K 9/00798 701/41 |
| 2017/0066459 | A1* | 3/2017 | Singh | B61L 23/044 |
| 2018/0137596 | A1* | 5/2018 | Chenu | B61L 15/0027 |

* cited by examiner

*Primary Examiner* — Ali Bayatt
(74) *Attorney, Agent, or Firm* — Greer, Burns & Crain, Ltd.

(57) ABSTRACT

A method for controlling a vehicle moving along a track of a transport network has an acquisition phase wherein an image is acquired by a video input on board the vehicle. The image represents a portion of the track of the transport network around the vehicle and information displayed by a display onboard the vehicle. The information represent at least part of a parameter relating to the vehicle and/or the transport network. During a processing phase, the displayed information are processed on the basis of the image by a processor, thereby allowing to control the vehicle on the basis of the parameter and/or image.

20 Claims, 3 Drawing Sheets

METHOD, SYSTEM AND APPARATUS FOR CONTROLLING A VEHICLE

CROSS-REFERENCE TO RELATED APPLICATIONS

N/A

FEDERALLY SPONSORED RESEARCH OR DEVELOPMENT

N/A

TECHNICAL FIELD

In its most general aspect, the present invention relates to a method, a system, and an apparatus for controlling a vehicle moving along a track of a transport network; in particular, for controlling a vehicle moving along a railway track of a transport network. More in details, this invention is directly applicable to the problem of automatic train protection (ATP) in railway signalling, especially in CBTC-type systems, i.e. Communication Based Train Control systems. It is highlighted that the teachings of this invention can be extended for ensuring safety of movement of any vehicle moving on a known track or road, e.g. rubber-tyred trams, trolleybus or the like.

BACKGROUND OF THE INVENTION

As is known, CBTC systems determine the position of the train using transponders (also called balises) along the track at regular locations. These electromagnetic devices are used as reference points to position the train with a precision of 1 meter or less. Between two transponders, the CBTC on-board vital computer determines the change of position of the train using data from wheel rotation sensors and/or inertial sensors. The safety of the calculation of the position of the train relies on having multiple sensors of each type and performing within an on-board vital CBTC computer a safe vote procedure, i.e. comparing the data coming from different sensor in order to discover anomalies. Installation of an on-board CBTC computer and its peripherals (transponder reader, tachometer or speed sensor, inertial sensors) is thus a delicate operation, and maintaining these equipments is expensive due to the required hardware redundancy for safety.

Furthermore, CBTC systems typically allow trains to run at optimized intervals that are much closer than what traditional systems using traffic signals allow. As a consequence, installing CBTC often has the side effect of requiring traditional signals to be "cancelled" (i.e. updated for indicating to the driver that said signals have not to be respected) when a CBTC train is approaching (otherwise, the driver may be required to run through a red signal). This is done by adding a new aspect to the signal, i.e. changing or modifying the existing signals. This can be a significant cost and scheduling problem for CBTC deployment. It also increases the cost of maintenance, because in case of a signal failure leading to the unavailability of the "cancel" aspect, the availability of the system will be affected.

In the U.S. Pat. No. 8,233,662 B2, it is discloses a system comprising a camera positioned on a railway car, and adapted to acquire light signals emitted from light transmitters that are installed along the railway. This solution requires an upgrade (also known as revamp) of the railway signals or the installation of new signals along the railway tracks, by increasing the time necessary to deploy a CBTC system on an existing transport network.

SUMMARY

The present invention aims to solve these and other problems by providing a method, a system, and an apparatus for controlling a vehicle moving along a track of a transport network.

The main idea of the present invention is to acquire, from onboard of the vehicle, images of the track and of the information displayed onboard. More in details, the camera observes the track ahead of the train, as well as the information displayed on visualization means (such as an LCD panel, a transparent head-up display, or the like) available to the driver. In this way, there is no need to modify signals because the on-board control unit can guarantee that the head-up display is indeed displaying critical information to the driver, such as the cancellation status of the signal.

According to this teaching, the invention comprises a control method, a system, and an apparatus for carrying out the invention, whose features are set forth in the appended claims.

In this manner, it is possible to make cross checking of data acquired from images, thereby improving safety and effectiveness of the transport network.

Another important aspect of this invention is that the safety of the system is ensured by reading back on the visualization means a coded random number (or pattern) that is generated by the vital computer. By comparing this number to the detected number (or pattern) on the image, the on-board control unit can determine whether the information is fresh, i.e. not buffered. In other words, the combination of the vital computer, the visualization means and the camera create an intrinsically safe display and video detection system, which can be used in place of ATP systems according to the state of the art, such as but not limited to CBTC.

Furthermore, the critical information can be displayed on augmented reality devices (e.g. a head-up display). This further makes possible to remove many classical signalling devices (such as light signals, balises, speed sensors, or the like) because a representation thereof can be displayed on the windscreen of the vehicle without distracting the driver's attention.

Furthermore, the camera is able to calculate the speed and position of the train by detecting track fixed markers, which may show specific QR code, equivalent coded pattern, or the like. The QR codes or the like may play the role of balises in a CBTC system, e.g. allowing the calculation of the position of the train (with centimeter precision) by using trigonometry.

It is highlighted that this invention is totally compatible with existing on-board train control systems such as CBTC, since it simply replaces the localization sub-system with a more cost-efficient technology.

Furthermore, the invention makes possible to increase the reliability and reduce the whole-life cost of the entire transport network because the number of the overall components is reduced. More in details, this invention allows, among others, the following simplifications:

- on-board wheel or inertial sensors are no more necessary because the camera is sufficient to localize the vehicle within the transport network;
- it is no more necessary to take into account of wheel slipping or sliding, because the distances are directly and continuously measured;

transponder sub-system is no more necessary because the camera can be used for acquiring images and the control unit is configured for recognizing signs, such as QR codes or the like;

trip stop subsystem is no more necessary because the control unit can process the images acquired by the camera in order to detect if lamps are on or off, and activate emergency brakes if an unsafe situation occurs.

Finally, it should be noted that cameras can also be used to offer additional, previously unavailable functions such as driver assistance (e.g. obstacle detection) or asset monitoring (e.g. rail condition monitoring).

Further advantageous features of the present invention are the subject of the attached claims Other features and advantages of the invention will be apparent from the following specification taken in conjunction with the following drawings.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION

Figure 1:
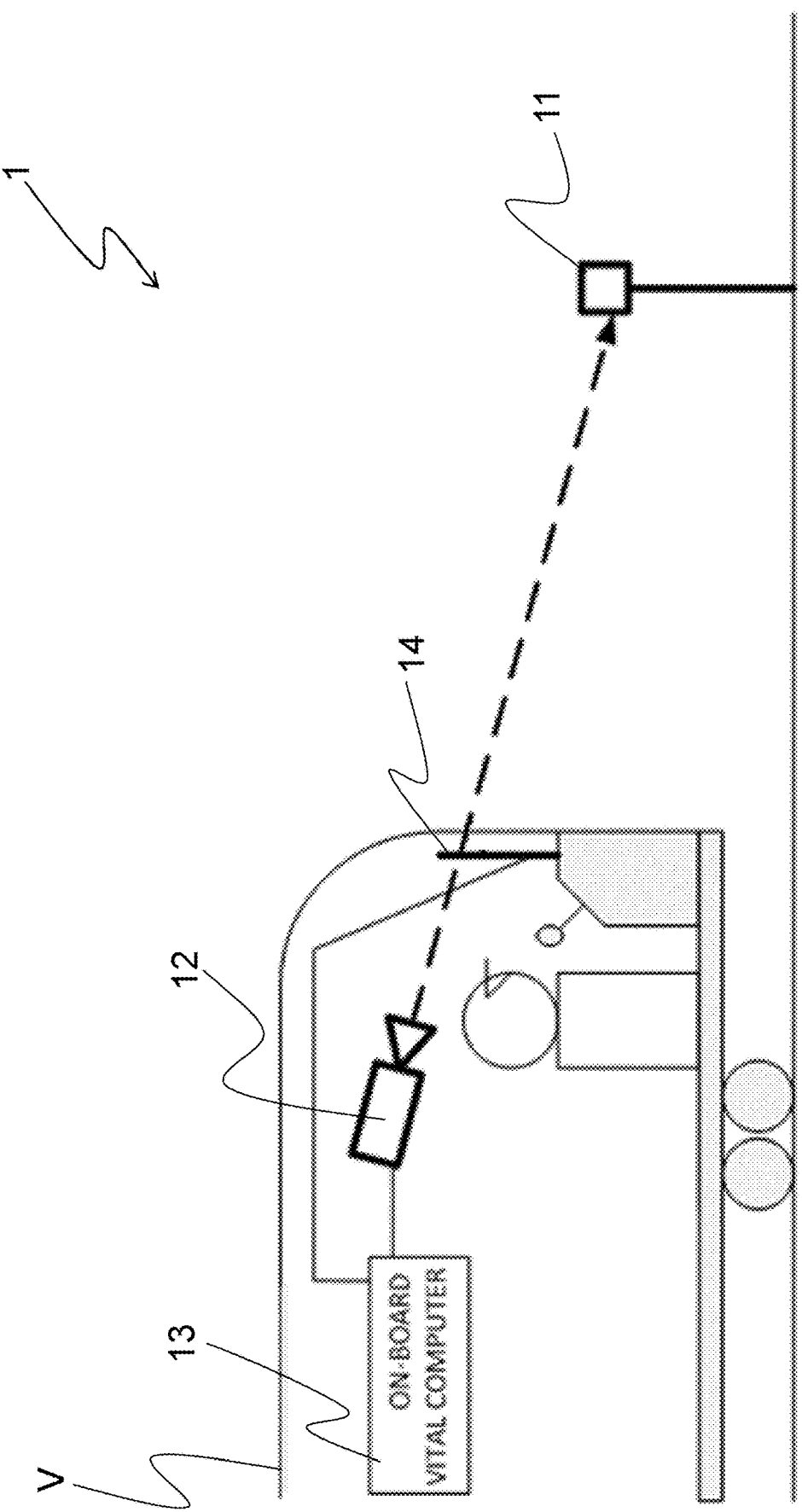
FIG. 1 shows a schematic representation of a system according to the invention.

In this description, any reference to "an embodiment" or "an example" will indicate that a particular configuration, structure or feature described in regard to an implementation of the invention is comprised in at least one embodiment. Therefore, the phrase "in an embodiment" and other similar phrases, which may be state in different parts of this description, will not necessarily be all related to the same embodiment. Furthermore, any particular configuration, structure or feature shown in the drawing or described herein may be combined in one or more embodiments according to any way deemed appropriate. The numerical references below are therefore used only for simplicity's sake, and do not limit the protection scope or extension of the various embodiments.

With reference to FIG. 1, a system 1 for vehicle signalling according to the invention preferably comprises the following elements:

a (optional) passive signal 11 (e.g. a signal comprising a two-dimensional barcode) positioned along a track of a transport network (e.g. a railway network), i.e. a signal which does not require electrical power and/or does not change its own status (e.g. changing its lighting colors and/or frequency and/or the like);

visualization means 14 (also referred to as 'display means'), e.g. a LCD screen, a head up display, instrument panel, or the like, for displaying a representation of at least one parameter relating to said vehicle (e.g. the speed, the position, the time) and/or said transport network (e.g. signals status);

an onboard camera 12 (also referred to as 'video means') configured for capturing at least one image representing at least a portion of the track of the transport network around the vehicle on which said camera can be positioned, and at least part of the representation of said parameter displayed by said visualization means 14, e.g. an infrared sensible camera which may be positioned inside a trains, preferably behind of a windscreen of a railway car (such as a locomotive, a front car or the like), so as to capture the railway track ahead the train;

a control unit (also referred as 'apparatus for vehicle signalling') positionable onboard said vehicle in communication with said camera, and configured for performing the following activities:

acquiring said at least one image;

computing said at least one parameter on the basis of said portion of the track represented in said at least one image, e.g. the speed and/or the position of a train and/or the status of the signals ahead the train, or the like;

checking, on the basis of said at least part of the representation of said at least one parameter represented in said at least one image, whether said at least one parameter are displayed on said visualization means 14.

This makes possible to simplify the signalling along the transport network, and to reduce the amount of instruments to install in/on the dashboard of the vehicle, e.g. tachometer, lights and/or screens for repeating signal onboard, or the like. In this way, it is possible to reduce the maintenance time and the probability of failures that may stop the circulation within the transport network. Furthermore, the invention also may drastically reduce the maintenance costs.

Therefore, a vehicle V (such as metro or train locomotive or wagon, tram, cable car or the like) comprises the video means 12 for acquiring video images of the track, the display means 14 for displaying at least one parameter relating to the vehicle, and wherein the video means 12 acquire images also of the display means (14).

Figure 2:
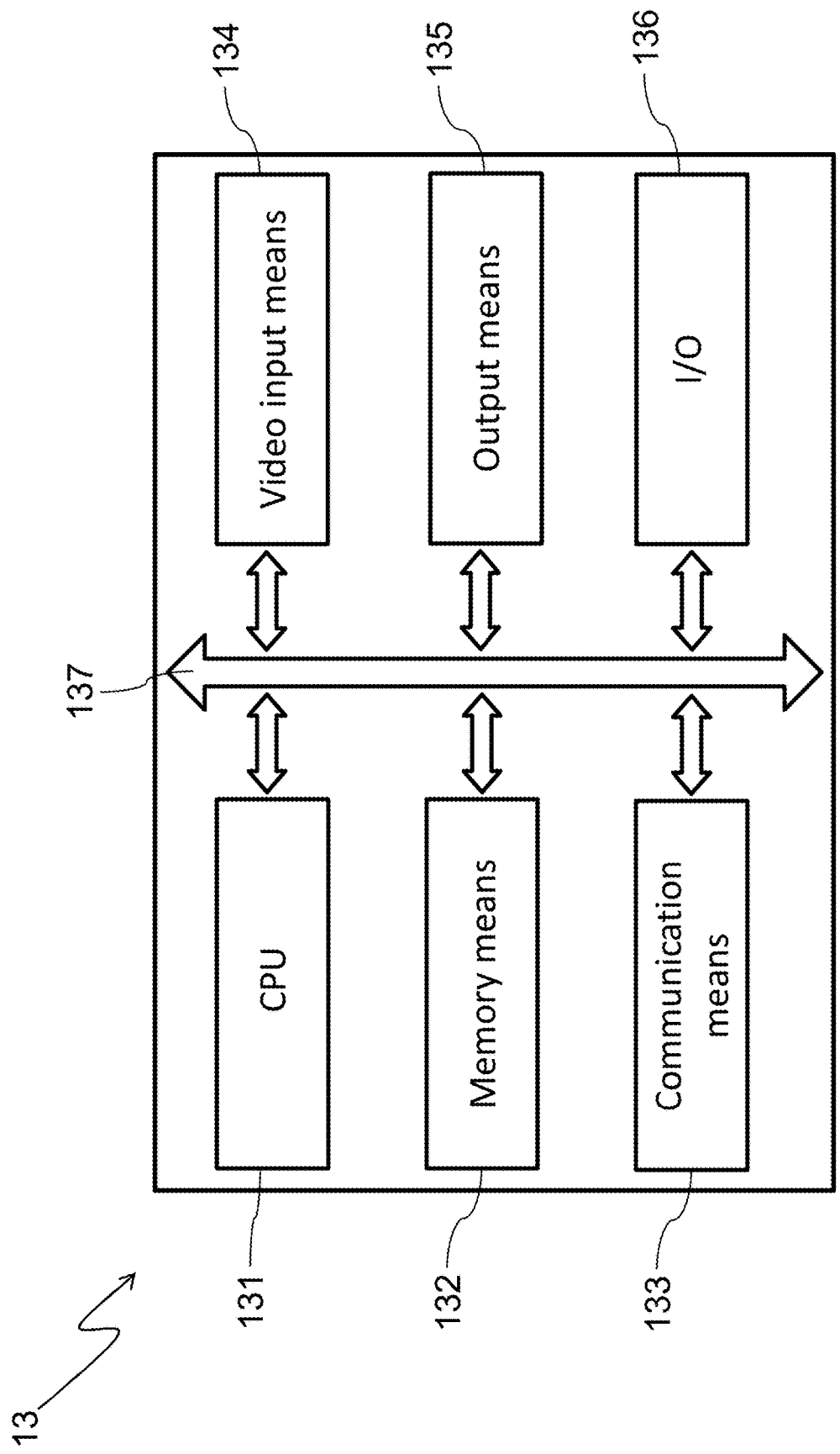
FIG. 2 shows a block diagram of an apparatus according to the invention.

With also reference to FIG. 2, the apparatus 13 according to the invention comprises the following parts:

output means 135 (e.g. an Universal Serial Bus interface, an output video interface such as a VGA, HDMI, S-Video output interface, or the like) configured for outputting at least one parameter relating to said vehicle and/or said transport network, wherein said output means 135 can be in communication with the visualization means 14 for displaying a representation of said at least one parameter (e.g. vehicle speed) onboard said vehicle;

video input means 134 (e.g. a serial interface, an Universal Serial Bus interface, an video acquisition interface such as an S-Video input interface, or the like), which are adapted to acquire, at least one image, which can be captured by the camera 12, representing the portion of the track of the transport network around the vehicle on which said camera can be positioned, and at least part of the representation of the parameter displayed by said visualization means 14;

memory means 132 (e.g. a ROM, RAM, HDD, SSD memory) that may contain a set of instructions implementing a method for vehicle signalling according to the invention;

processing means 131 (e.g. a CPU, a microcontroller, an FPGA, or the like) in signal communication with video input means 134, the output means 135, and the memory means 132, which are preferably configured for executing a set of instructions implementing a method for vehicle signalling according to the invention;

input/output (I/O) means 136, which may be used, for example, to connect peripherals (e.g. a touchscreen, external mass storage units, or the like) or a programming terminal configured for writing instructions into said memory means 132 (to be then executed by the processing means 131); said input/output means 136 may comprise, for example, a USB, Firewire, RS232, IEEE 1284 interface, or the like;

a communication bus 137 allowing information to be exchanged among the processing means 131, the memory means 132, the video input means 134, the output means 135 and the input/output means 136.

As an alternative to the communication bus 137, a star architecture may connect the processing means 131, the memory means 132, the video input means 134, the output means 135, and the input/output means 136.

The processing means 131 are configured for executing the following steps:

reading, by means of said video input means 134, said at least one image;

computing said at least one parameter on the basis of said portion of the track represented in said at least one image;

checking, on the basis of said at least part of the representation of said at least one parameter represented in said at least one image, whether said at least one parameter are displayed on said visualization means 14.

The apparatus 1 preferably executes, when it is in an operative condition, a set of instructions that implements the method according to the invention. This method comprises the following phases:

an acquisition phase, wherein at least one image is acquired by means of video input means 134 on board the vehicle, wherein said at least one image represents at least the portion of the track of the transport network around the vehicle, and the information displayed by the visualization means 14 onboard said vehicle, wherein said information represent at least part of at least one parameter relating to the vehicle and/or said transport network;

a processing phase, wherein said displayed information are processed on the basis of said at least one image by processing means (131).

This allows controlling the vehicle on the basis of said at least one parameter and/or image, so as the number of signals necessary within the transport network is reduced. In this way, the maintenance time and the probability of failures that may stop the circulation within the transport network result also reduced.

The deployment of visualization means 14 (such as an head-up display or the like) in a safe critical environment (e.g. on a railway car) requires the adoption of additional safety measures; in particular, it is necessary to ensure that the information displayed by said visualization means 14 are always correct and (properly) updated.

In order to fulfill the above-mentioned requirement, the control unit 13 may generate a control string HC, preferably an alphanumerical string or a string of graphic symbols (e.g. a linear barcode or the like), to display on the head-up display 14, so as the camera 12 can capture said string HC. This enables the control unit 13 to verify whether the control string generated and the control string captured by means of the camera 12 are the same.

In other words, the camera 12 may be positioned so as said at least one image (captured by the camera 12) also represents at least a portion of said head-up display 14 and the representation of the state data displayed thereon, and wherein the processing means 131 of the control unit 13 may be also configured for performing (during the processing phase) the following steps:

generating a first control string HC on the basis of the state data, e.g. by computing a hash of said state data;

transmitting said first control string HC to the head-up display 14 by means of output means 135, so as said display 14 can represent said state data in a visible manner;

recognizing a second control string represented in said at least one image captured by the camera 12, e.g. by running a set of instructions implementing an Optical Character Recognition (OCR) algorithm;

verifying whether the first control string HC and the second control string have the same content.

As already mentioned above, the processing means 131 of the control unit 13 may be configured for generating (during the processing phase) the first control string by computing a hash of said parameters, i.e. said control unit may be configured for running a set of instructions implementing a hashing algorithm that takes the state data as input, and generates the first control string as output. In this way, it is possible to verify constantly that the information shown on the visualization means 14 are updated, by making possible to operate the visualization means 14 in safe-critical environments. This reduces the amount of instruments to install in/on the dashboard of the vehicle, by reducing the maintenance time and the probability of failures that may stop the circulation of the vehicle within the transport network.

Figure 3:
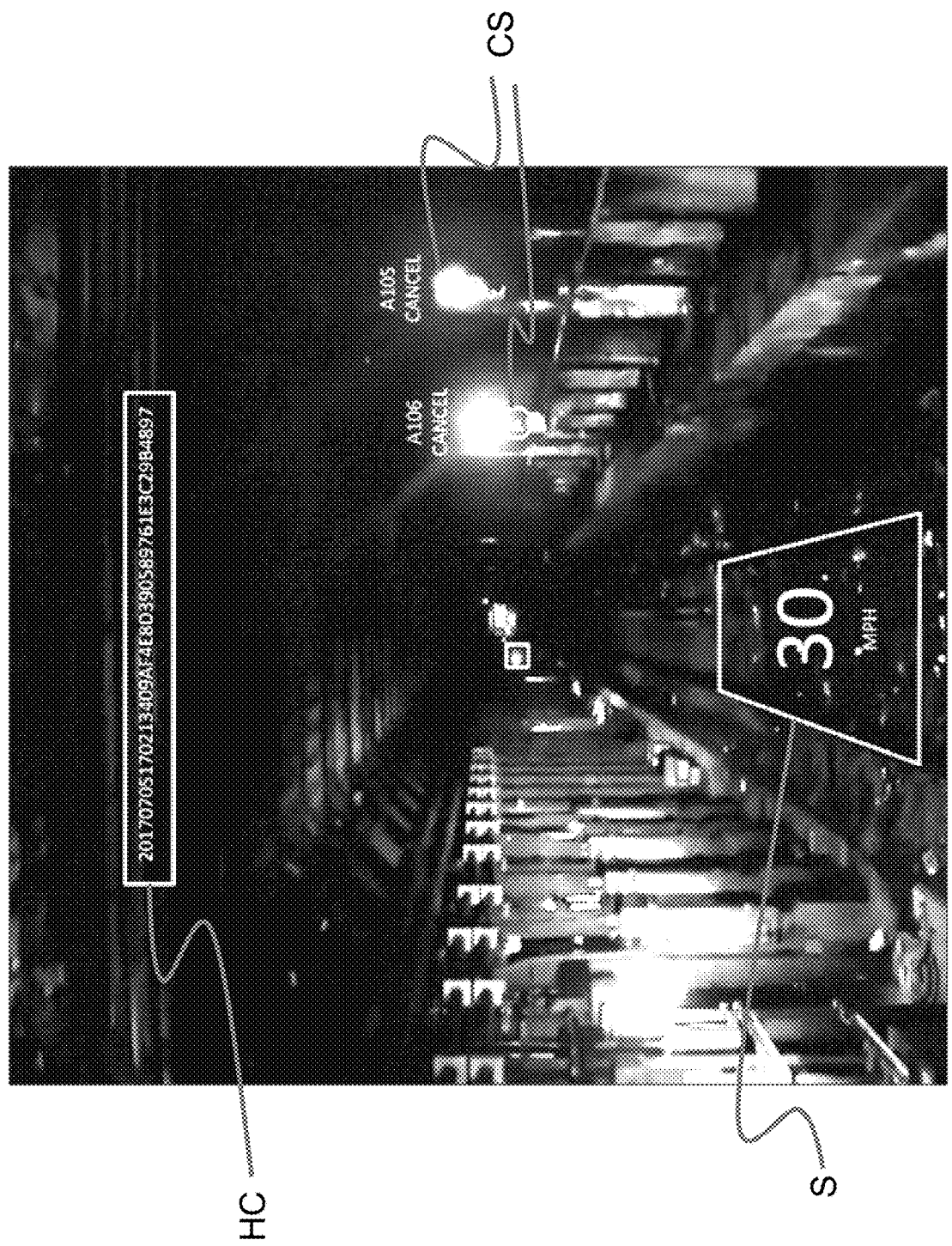
FIG. 3 shows an image depicting the information displayed on a head-up display comprised in the system shown in FIG. 2.

With reference to FIG. 3, the visualization means 14 may comprise, alternatively or in combination with the above-described features, a head-up display (preferably of OLED type) in communication with the control unit 13; such head-up display 14 may be configured for displaying a representation of the parameter, e.g. two or three digits S representing the speed value of the vehicle on which said display 14 is installed, one or more signal icons CS representing the status (e.g. the "cancellation status") of the signals that said vehicle is approaching, or the like.

The head-up display 14 is particularly advantageous for displaying critical information, since the vehicle driver should not continuously move his/her gaze from the windscreen to the dashboard (and viceversa) while driving the vehicle, so as to reduce the risk of accidents. Furthermore, this makes possible to reduce the amount of instruments to install in/on the dashboard of the vehicle, e.g. tachometer, lights and/or screens for repeating signal onboard, or the like. In this way, it is possible to reduce the maintenance time and the probability of failures that may stop the circulation of the vehicle within the transport network.

As already described above, the parameter(s) may comprise positional data representing a position of said vehicle along the track of said transport network. This makes possible to reduce the number of train detectors installed along a railway track, by making possible to reduce the maintenance time and the probability of failures that may stop the circulation within said transport network.

More in details, the processing means 131 of the apparatus 13 may be configured for determining (during the processing phase) the position the vehicle by also using mapping data, preferably contained into the memory means 132), which represent a model (preferably a tridimensional model) of the track of the transport network. The mapping data can be used together with the image(s) captured by the camera 12 for determining the position with centimeter precision of the vehicle within the transport network by recognizing relevant objects (e.g. railway signals, platforms or the like) and matching them within the model provided by the mapping data, e.g. by using a set of instructions implementing a Neural Network, preferably a Deep Neural Network (DNN) or the like. This approach is particularly advantageous for underground trains, since positioning system such as Global Navigation Satellite System (GNSS) (e.g. GPS, GLONASS, Galileo, QZSS, BeiDou, or the like) cannot be efficiently and effectively used underground.

For example, these mapping data can be generated through tridimensional photogrammetry periodically accomplished by a service train specifically equipped with high-resolution odometers and high-resolution cameras acquiring high resolution pictures during maintenance tasks. In this way, it is possible to generate a high resolution tridimensional map, through an algorithm according to the state of art, by associating at each position determined through the high-resolution odometers a set of pictures taken by the high-resolution cameras.

In other words, the processing means 131 of the control unit (i.e. the apparatus) 13 may be configured for determining the positional data by comparing said at least one image with mapping data representing a model of said track of the transport network. This makes possible to reduce further the number of train detectors installed along the track of the transport network, by reducing the maintenance time and the probability of failures that may stop the circulation within said transport network.

Alternatively or in combination with the above-described features, the parameter(s) may comprise signalling data representing at least a state of a signal that should be respected by said vehicle, e.g. a signal in front of the train car. In this way, it is possible to reduce the number of active signals installed along the track of the transport network. This makes possible to reduce the maintenance time and the probability of failures that may stop the circulation within said transport network.

More specifically, the processing means 131 of the control unit 13 may comprise communication means 133 for communicating with a control station (e.g. a central control station supervising train circulation and determining the status of each signal), wherein the control unit 13 is also configured for performing (during the processing phase) the following steps:
- recognizing at least said signal represented in said at least one image, by generating recognition data identifying said (track) signal (e.g. a list of identification codes, wherein each code identifies a specific signal along the railway recognized by the control unit 13);
- transmitting, through the communication means 133, said recognition data;
- receiving, through the communication means 133, signal status data representing the status of said signal (e.g. the color of the semaphore or the like);
- determining the signalling data on the basis of said signal status data, e.g. determining which information must be shown to the train driver, such as the "cancellation status" (i.e. whether the train driver must respect the signal or not), the color of the signal, or the like.

In this way, it is possible to reduce the number of active signals installed along the track of the transport network, by reducing the maintenance time and the probability of failures that may stop the circulation within said transport network.

Alternatively or in combination with the above-described features, the state data may comprise speed data representing a speed of said vehicle. In this way, it is possible to reduce the number of high precision odometers that should be installed on the vehicles travelling within the transport network. This makes possible to reduce the maintenance time and the probability of failures that may stop the circulation within said transport network.

More in details, the camera of said vehicle is configured for capturing at least two images in two distinct instants in time, and wherein the control unit 13 is configured for determining the speed data on the basis of said at least two images, e.g. by executing a set of instruction implementing an algorithm apt to perform the following steps:
- computing a difference matrix between two images;
- computing a translation value representing the forward/backward movement of the said vehicle on the basis of said difference matrix;
- computing a speed value on the basis of the said translation value and an interval value equals to the duration of a time interval between the two instants in which the two images has been captured.

This is particularly advantageous on a railway track because the railway sleepers are spaced from one another by a fixed distance. In this way, it is possible to reduce the number of high precision odometers installed on the vehicles and speed sensors installed along the transport network. This makes possible to reduce the maintenance time and the probability of failures that may stop the circulation within the transport network.

As already described above, the passive signal may comprise a two-dimensional barcode that can be captured by said camera 12, i.e. the barcode has a sufficient size to allow, at predetermined distance (e.g. 200 meters), the proper detection of the barcode by means of the camera 12, and the correct recognition of the identifier of said signal encoded in said barcode by means of the control unit 13.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

What is claimed is:

1. A method for controlling a vehicle moving along a track of a transport network, comprising:
    an acquisition phase, wherein at least one image is acquired by means of video input means on board the vehicle, wherein said at least one image represents at least
        a portion of the track of the transport network around the vehicle, and
        information displayed by visualization means onboard said vehicle, wherein said information represent at least part of at least one parameter relating to the vehicle and/or said transport network,
    a processing phase, wherein said displayed information are processed on the basis of said at least one image by processing means,
    thereby allowing to control the vehicle on the basis of said at least one parameter and/or image.

2. The method according to claim 1, wherein, during the processing phase, said displayed information are processed, through the processing means, by
- generating a first control string on the basis of the said at least one parameter,
- transmitting said first control string to the visualization means,
- recognizing a second control string represented in said at least one image captured by the video input means during the acquisition phase, and
- verifying whether the first and the second control string have the same content.

3. The method according to claim 2, wherein, during the processing phase, the first control string is generated by computing a hash of said state data through the processing means.

4. The method according to claim 1, wherein said at least one image acquired during the acquisition phase represents at least the information displayed by a head-up display, a screen, or the like.

5. The method according to claim 1, wherein said at least one parameter comprises positional data representing a position of said vehicle along the track of said transport network.

6. The method according to claim 5, wherein, during the processing phase, the positional data are determined, through the processing means, by comparing said at least one image with mapping data representing a model of said track.

7. The method according to claim 1, wherein said at least one parameter comprises signalling data representing at least a state of a signal positioned along said track.

8. The method according to claim 7, wherein, during the processing phase, the signalling data are computed, through the processing means, by
- recognizing at least said signal represented in said at least one image, by generating recognition data identifying said signal,
- transmitting, through communication means, said recognition data,
- receiving, through the communication means, signal status data representing the status of said signal,
- generating the signalling data on the basis of said signal status data.

9. The method according to claim 1, wherein said at least one parameter comprises speed data representing a speed of said vehicle.

10. The method according to claim 9, wherein, during the acquisition phase, at least two images are captured in two distinct instants in time by means of the video input means, and wherein, during the processing phase, the speed data are determined on the basis of said at least two images by means of the processing means.

11. A computer program product which can be loaded into the memory of an electronic computer, and which comprises portions of software code for executing the phases of the method according to claim 1.

12. A system for controlling a vehicle moving along a track of a transport network, comprising
- visualization means for displaying a representation of at least one parameter relating to said vehicle and/or said transport network,
- an onboard camera configured for capturing at least one image representing at least
  - a portion of the track of the transport network around the vehicle on which said camera can be positioned, and
  - at least part of the representation of said at least one parameter displayed by said visualization means,
- a control unit positionable on said vehicle and in communication with said camera, and configured for
  - acquiring said at least one image,
  - computing said at least one parameter on the basis of said portion of the track represented in said at least one image, and
  - checking, on the basis of said at least part of the representation of said at least one parameter represented in said at least one image, whether said at least one parameter are displayed on said visualization means.

13. The system according to claim 12, wherein the control unit is also configured for
- generating a first control string on the basis of said at least one parameter,
- transmitting said first control string to the visualization means,
- recognizing a second control string represented in said at least one image captured by the camera, and
- verifying whether the first and the second control string have the same content.

14. The system according to claim 12, comprising a passive signal positioned along a track of a transport network.

15. The system according to claim 14, wherein the passive signal comprises a two-dimensional barcode that can be captured by said camera.

16. The system according to claim 12, wherein the visualization means comprises a head-up display.

17. A use of a system according to claim 12 for controlling a vehicle moving along a railway track of a railway network.

18. A use of a system according to claim 12 for controlling a vehicle moving along a railway track of a railway network comprising a Communication Based Train Control system.

19. An apparatus for controlling a vehicle moving along a track of a transport network, comprising
- output means configured for outputting at least one parameter relating to said vehicle and/or said transport network, wherein said output means can be in communication with visualization means for displaying a representation of said at least one parameter onboard said vehicle,
- a video input means configured for acquiring at least one image, which can be captured by a camera onboard said vehicle, representing at least
  - a portion of the track of the transport network around the vehicle on which said camera can be positioned, and
  - at least part of the representation of the parameter displayed by said visualization means,
- processing means configured for
  - reading, by means of said video input means, said at least one image,
  - computing said at least one parameter on the basis of said portion of the track represented in said at least one image, and
  - checking, on the basis of said at least part of the representation of said at least one parameter represented in said at least one image, whether said at least one parameter are displayed on said visualization means.

20. A vehicle comprising video means for acquiring video images of a track of a transport network, display means for displaying at least a representation of at least one parameter relating to the vehicle, and an apparatus for controlling said vehicle when it moves along said track, wherein the video means acquire images also of the display means, and wherein said apparatus comprises:
- output means configured for outputting at least one parameter relating to said vehicle and/or said transport network, wherein said output means are in communication with the display means,
- a video input means configured for acquiring at least one image, through the video means, representing at least
  - a portion of the track of the transport network around the vehicle on which said video means are positioned, and
  - at least part of the representation of the parameter displayed by said display means,
- processing means configured for
  - reading, by means of said video input means, said at least one image,
  - computing said at least one parameter on the basis of said portion of the track represented in said at least one image, and
  - checking, on the basis of said at least part of the representation of said at least one parameter represented in said at least one image, whether said at least one parameter are displayed on said display means.

\* \* \* \* \*